May 18, 1954

S. PHILIBOSIAN ET AL 2,678,522

SANDING MACHINE

Filed April 19, 1950

INVENTORS
OLIVER R. ROWE,
WILLIAM J. STOLP AND
STEPHEN PHILOBOSIAN

By *Parrott and Richards*

ATTORNEYS

May 18, 1954  S. PHILIBOSIAN ET AL  2,678,522
SANDING MACHINE
Filed April 19, 1950  11 Sheets-Sheet 3

Inventors
OLIVER R. ROWE,
WILLIAM J. STOLP AND
STEPHEN PHILOBOSIAN
By Parrott and Richards
ATTORNEYS

INVENTORS
OLIVER R. ROWE,
WILLIAM J. STOLP AND
BY STEPHEN PHILOBOSIAN

Parrott and Richards
ATTORNEYS

May 18, 1954

S. PHILIBOSIAN ET AL

2,678,522

SANDING MACHINE

Filed April 19, 1950

INVENTORS
OLIVER R. ROWE,
WILLIAM J. STOLP AND
BY STEPHEN PHILOBOSIAN

*Parrott and Richards*
ATTORNEYS

May 18, 1954 S. PHILIBOSIAN ET AL 2,678,522
SANDING MACHINE
Filed April 19, 1950 11 Sheets-Sheet 8

Inventors
OLIVER R. ROWE
WILLIAM J. STOLP AND
STEPHEN PHILOBOSIAN
By Parrott and Richards
ATTORNEYS May 18, 1954

S. PHILIBOSIAN ET AL

2,678,522

SANDING MACHINE

Filed April 19, 1950

INVENTORS
OLIVER R. ROWE,
WILLIAM J. STOLP AND
BY STEPHEN PHILOBOSIAN

Parrott and Richards

ATTORNEYS

UNITED STATES PATENT OFFICE 2,678,522

SANDING MACHINE

Stephen Philibosian, Oliver R. Rowe, and William J. Stolp, Charlotte, N. C., assignors to R. H. Bouligny, Inc., a corporation of North Carolina Application April 19, 1950, Serial No. 156,778

11 Claims. (Cl. 51—139)

This invention relates to sanding machines of the type in which a continuous sanding belt is arranged for application by a pressure pad to the work to be sanded, and more especially to a sanding machine of this type which is particularly well adapted for sanding woodwork having an irregular surface contour such as molding and the like, and in which the work is fed through the machine in a manner that results in exceptionally high speed operation.

According to the present invention a particularly advantageous arrangement is provided for disposing the endless sanding belt for application to the work to be sanded. Generally described, this arrangement comprises a driven pulley and an idler pulley disposed on the machine in spaced relation for carrying the endless sanding belt, and a pressure pad disposed intermediate these spaced pulleys for applying the sanding belt to the work to be sanded. The idler pulley is disposed according to this arrangement so that it is adjustable longitudinally with respect to the reach of the endless sanding belt and pivotally on an axis aligned with the medial cross-section of the idler pulley, so that the idler pulley is readily adjustable not only for regulating the slack in the sanding belt but also for truing or tracking the sanding belt on the pulleys, and further for allowing the sanding belt to be removed readily when desired. Also, one or both of the sanding belt pulleys (usually the driver pulley at least) are fitted with auxiliary idler rollers in a manner which aids greatly in maintaining the sanding belt properly extended to its full width as it passes over the pulleys, and which provides further means for truing or guiding the sanding belt for proper tracking on the pulleys.

Another feature of this arrangement of the present invention is that the driven pulley is operated to drive the sanding belt in a direction opposite to the direction in which the work to be sanded is fed, and is disposed on the machine at the end opposite to the end at which the work to be sanded is fed, so that slack is induced in the endless sanding belt between the driven pulley and the pressure pad for facilitating application of the endless belt by the pressure pad of the work to be sanded. This operation of the driven pulley to drive the sanding belt oppositely to the direction of work feed also provides the important advantage of maintaining an end to end relation of the work pieces as they are fed beneath the sanding belt.

A further feature of the present invention is the arrangement of a supporting arm for the pressure pad which is pivoted on a horizontal axis to allow the pressure pad to be lowered or raised for application or release of the endless sanding belt, and which is disposed with a pivoted extent in raised position substantially parallel with the line of travel of the sanding belt, so that adequate clearance is provided for disposition and application of the pressure pad between the working and return reaches of the sanding belt by pulleys no larger than are necessary for carrying the sanding belt to the best advantage. In addition, the pressure pad is uniquely mounted on the supporting arm so that it is free to float in all directions in order to find its proper position when lowered for working contact with the work to be sanded, while at the same time being contained in longitudinal alignment with the line of travel of the work.

The supporting arm carrying the pressure pad is also formed with a pivoted joint having an axis disposed at right angles to its horizontal pivot axis so as to allow lateral movement of the supporting arm, and this pivoted joint is arranged so that its axis is positioned substantially vertically when the supporting arm is disposed to position the pressure pad at its farthest downward extent. With this arrangement, the axis of the pivoted joint is always inclined from the vertical whenever work is fed beneath the sanding belt, so that any force tending during the sanding operation to move the pressure pad laterally out of line will cause movement of the supporting arm to resist this force, with the result that application of the pressure pad is rendered inherently stable.

The sanding machine of the present invention is also equipped with a feed table for maintaining a supply of work in position for feeding through the machine, and which is arranged to insure that no stoppage or gap occurs in the flow of work through the machine. This feed table comprises a conveyor belt and associated guides arranged to channel the work in line from the feed table, and a gate member disposed in relation to these guides so that only one work piece can pass from the feed table at a time, which makes it possible to place the work pieces rapidly on the feed table without precise arrangement so long as they are resting on the conveyor belt. In addition, this feed table is arranged so that the mounting pulleys for the conveyor belt may be easily manipulated for removal and replacement of the conveyor belt when necessary. Beyond the feed table, the machine is further equipped with bottom and top feed rolls, both of which of are driven for feeding the work beneath the sanding belt, but which are nevertheless adjustable for spacing as necessary to handle various sizes of work to be sanded.

These and other features of the present invention are described further below in connection with the accompanying drawings, in which.

Referring now in detail to the drawings, and in particular at first to Figs. 1 to 4, the sanding machine of the present invention as shown comprises a frame structure S arranged to form a sanding bed for supporting work to be sanded, a driven pulley D and an idler pulley I disposed on the frame structure S in spaced relation for carrying an endless sanding belt B, feed means F for feeding work to be sanded beneath the endless sanding belt B, means for securing guide members in place as at G on the frame structure S for directing the work fed for sanding longitudinally of the reach of the endless sanding belt B, a pressure pad P disposed on the frame structure S intermediate the spaced pulleys D and I for applying the endless sanding belt B to the work, and a feed table T arranged for maintaining a supply of work to be sanded at the feeding means F.

The frame structure S may be arranged in any suitable manner for supporting the operating elements of the sanding machine as may be indicated or required in particular instances. As shown in the drawings, it is formed with an enclosed base portion 10 fitted appropriately with an access door as at 12 for providing a convenient storage space to accommodate tools and maintenance supplies and the like such as may be needed in operating the sanding machine. The frame structure S is also preferably formed with an upper hood portion 14 arranged with at least one fitting as at 16 for attachment to a suction recovery line to carry off the dust produced during the sanding operation.

This hood portion 14 is open at the front, and may be similarly open at the back to the extent desired, to permit the necessary supervision of the sanding operation, and to allow manipulation and adjustment of the operating elements readily by an operator. The hood portion 14 is also formed with openings at each end to allow work to be fed through the machine on the sanding bed formed by the top of the base portion 10, and the base portion 10 is fitted at this point with a plurality of spaced clamping arms 18 comprising (as shown in detail in Fig. 18) arm members 20 pivoted on fastening screws 22 and spacer bushings 24, and carrying clamping screws 26 at their extending ends which are formed with pointed tips as at 26' for securing the previously mentioned guide members G for the work being sanded in place.

Figure 26:
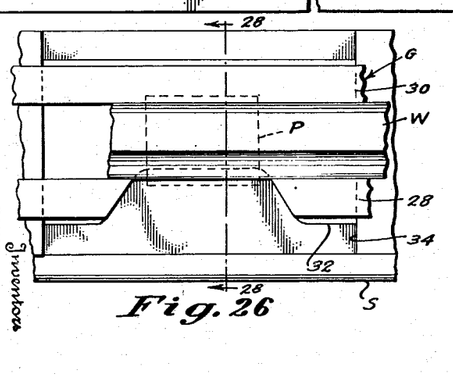
Fig. 26 is a fragmentary detail in plan illustrating the arrangement of guide means beneath the pressure pad for directing work to be sanded.
Figures 27, 28:
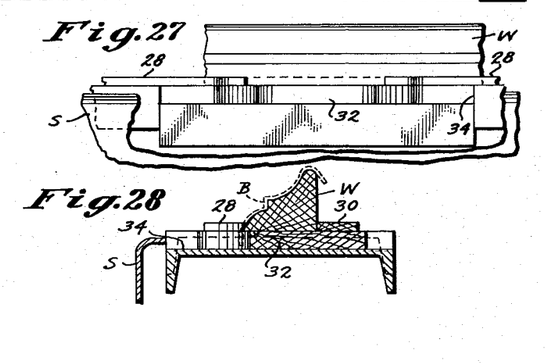
Fig. 27 is a fragmentary detail in side elevation corresponding generally to Fig. 26.
Fig. 28 is a sectional detail taken substantially on the line 28—28 in Fig. 26.

These guide members G may be arranged to the best advantage in most instances by forming them specially, in the nature of a jig, to form guide rails providing a closely fitting channel for handling the particular form of work to be sanded. Generally, they will consist of front and rear guide pieces as at 28 and 30 (see Figs. 26, 27 and 28) to channel the work as at W longitudinally beneath the sanding belt B, and usually a specially adapted support piece as at 32 arranged directly beneath the pressure pad P for providing a free path for the sanding belt B so that it may run in contact with the full contour of the work W to be sanded, which in molding contours will often extend to a bottom edge of the work W (compare Fig. 28).

As the guide members G must thus be fitted to meet the special requirements of the work W being handled, they can usually be installed most conveniently by forming them of wood, which can be worked easily to the form desired, and the clamping arms 18 provide an excellent means for fixing the wood pieces forming the guide members G in place in the variety of arrangements that may be required. Also, it should be noted that the sanding bed formed by the top surface of the base portion 10 of frame structure S is undercut as at 34 so as to allow a specially adapted guide support piece 32 as mentioned above to be clamped in place beneath the pressure pad P in line with the guide pieces 28 and 30 and level with the remainder of the sanding bed. The work W after sanding issues from the guide members G onto an end table mounted on the frame structure S as at 36, and from which the sanded work may be removed conveniently as the sanding operation is carried out.

As already noted, the sanding belt B is carried on the frame structure S by the driven pulley D and the idler pulley I. The driver pulley D is disposed on the frame structure S at the end opposite from the feed means F for a purpose which will be described more in detail presently. The idler pulley I is disposed at the other end of the frame structure S adjacent the feed means F, and is mounted on the frame structure S by a bracket assembly 100 as shown in detail in Figs. 6 to 9 of the drawings.

Figure 8:
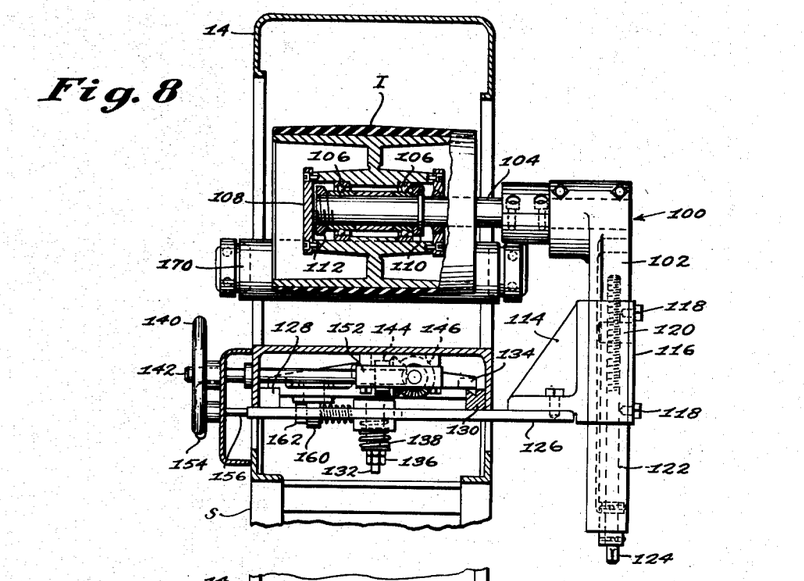
Fig. 8 is a detail, largely in section, as viewed substantially from the line 8—8 in Fig. 6.
Figure 9:
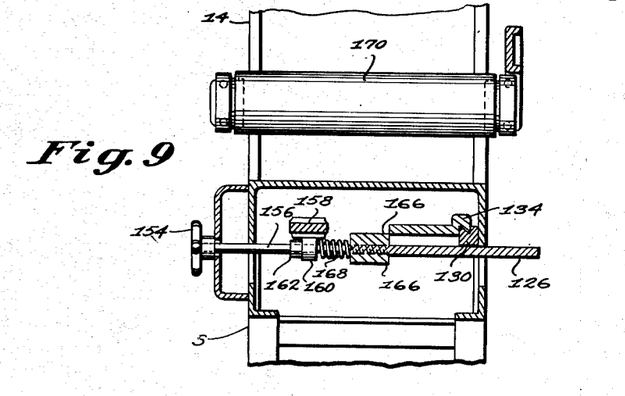
Fig. 9 is a sectional detail taken substantially on the line 9—9 in Fig. 7.
Figures 10, 11, 12:
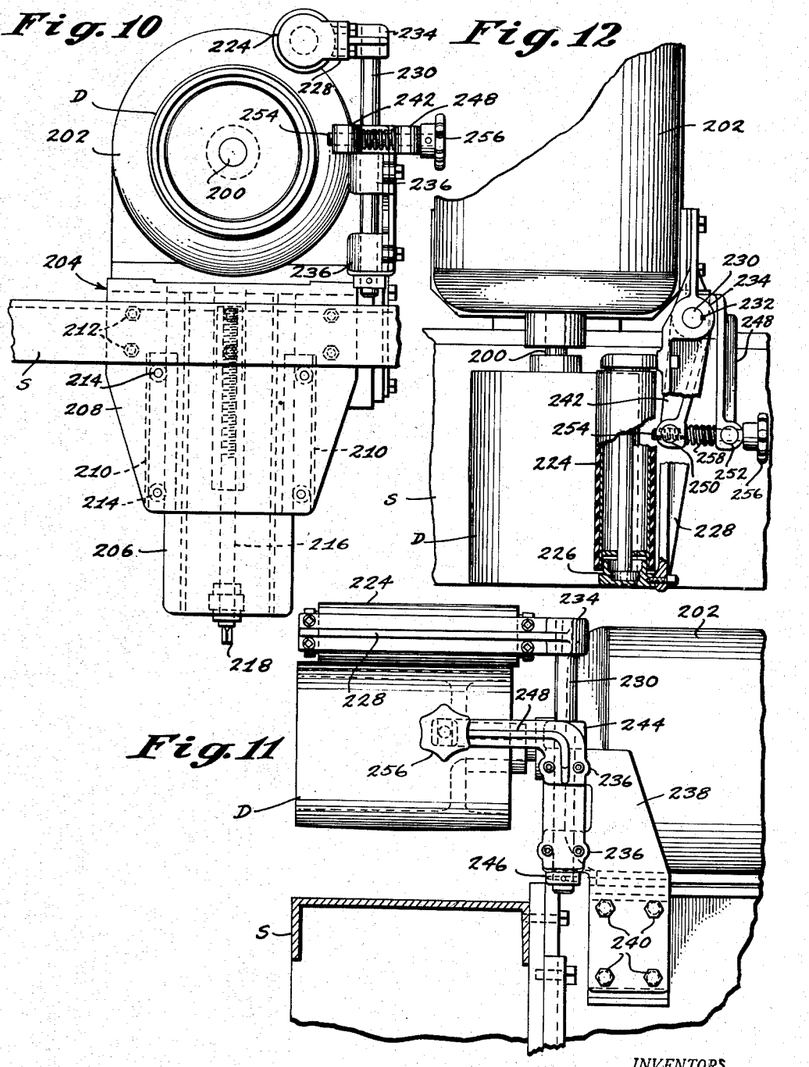
Fig. 10 is an enlarged side elevation detail of the driven pulley and related operating elements.
Fig. 11 is a corresponding end view from the right as seen in Fig. 10.
Fig. 12 is a partial detail in plan corresponding generally to Figs. 10 and 11.

This bracket assembly 100 comprises a support post 102 formed at its upper end for carrying a stub shaft 104 on which the idler pulley I is mounted for rotation by bearing units as at 106 fitted in the pulley hub 108 and fixed in spaced relation to the stub shaft 104 between a retaining ring 110 and a locknut 112 (see Fig. 8). The lower portion of the support post 102 is arranged for sliding adjustments in a bracket member 114 that is fitted with a clamping plate 116 which may be tightened down by screws 118 to grip the post 102 against movement in the bracket 114, but which is formed with a bored and tapped lug 120 through which an adjusting stud 122 extends from the lower end of the post 102 (compare Figs. 6 and 8). The lower tip of this adjusting stud 122 is squared off as at 124 to receive a wrench or the like so that, upon loosening the clamping plate 116, the adjusting stud 122 may be turned for raising or lowering the idler pulley I to a desired adjusted height above the sanding bed formed by the frame structure S.

The bracket member 114 carrying the support post 102 is in turn assembled on a bottom slide base 126 which extends beneath the sanding bed formed by the frame structure S for disposition against the bottom faces of front and rear slide bars 128 and 130 carried on the frame structure S. This bottom slide base 126 is formed to receive a central pivot pin 132 which is aligned vertically with the axis of the idler pulley I at its medial cross-section, and which is mounted in a top slide base 134 that is grooved to ride on top of the front and rear slide bars 128 and 130. The lower end of the pivot pin 132 is threaded for locknuts as at 136, which may be tightened up to the proper extent against a spring 138 disposed over the pivot pin 132 below the bottom slide base 126 to clamp the bottom and top slide bases 126 and 134 on the front and rear slide bars 128 and 130 securely against casual movement, while still leaving them free enough for longitudinal adjustment on the slide bars 128 and 130 as explained further below.

Longitudinal adjustment of the bottom and top slide bases 126 and 134 on the slide bars 128 and 130, which provides corresponding longitudinal adjustment or shifting of the idler pulley I in relation to the frame structure S for regulating the slack in the sanding belt B, is controlled from a handwheel 140 carried at the front of the frame structure S on a transverse shaft 142. This transverse shaft 142 is fitted with a bevel gear as at 144 disposed for engagement with a mating bevel gear 146 mounted at one end of a traverse screw 148 that extends for threaded engagement with the top slide base 134 as at 150, a bracket 152 being secured on the frame structure S for supporting the traverse screw 148 and the transverse shaft 142, as shown, with the bevel gears 144 and 146 in running engagement. This arrangement provides a relatively great mechanical advantage allowing easy longitudinal adjustment of the idler pulley I from the handwheel 140, while at the same time permitting the bottom and top slide bases 126 and 134 to be clamped tightly on the slide bars 128 and 130, as mentioned above, so that the idler pulley I will remain securely in place at any longitudinally adjusted position selected.

Pivoted adjustment of the idler pulley I, as already noted, is also provided by the above described arrangement of the bottom and top slide bases 126 and 134 by which the pulley I is carried on the frame structure S. This pivotal adjustment is made about the central pivot pin 132 which, being vertically aligned with the axis of idler pulley I at its medial cross-section, allows the pivotal adjustment to be made independently for truing or tracking the sanding belt B on the pulleys D and I without affecting the slack in the belt B attained at a given longitudinal adjustment of the pulley I.

The pivotal adjustment is controlled from an adjusting knob 154 at the front of the frame structure S which is mounted on a screw shaft 156 extending in operating engagement with both the top slide base 134 and the bottom slide base 126. The top slide base 134 is formed for this operating engagement with a lateral arm portion 158 having a boss which is bored to receive a pivot pin as at 160 with the shank of the pin 160 depending and in turn bored to receive the screw shaft 156 freely for rotation. The screw shaft 156 is positioned at this pivot pin 160 by a spacing collar 162 and extends through its bored shank for threaded engagement with a second pivot pin as at 164 which is carried in a pair of bracket plates 166 secured on the top and bottom faces of the bottom slide base 126, and a spring 168 is disposed over the screw shaft 156 between the pivot pin 160 and the adjacent edges of the bracket plates 166. The result of this arrangement is that the spring 168 maintains the spacing collar 162 in abutting relation with the first pivot pin 160 at all times while allowing the second pivot pin 164 to be taken up or let off on the screw shaft 156 and, as the top slide base 134 is grooved to ride on top of the slide bars 128 and 130 and is thereby fixed against pivotal movement, adjustment of the second pivot pin 164 in this manner on the screw shaft 156 causes pivoting of the bottom slide base 126 about the central pivot pin 132, which effects like pivoting of the idler pulley I for angular adjustment as desired from the adjusting knob 154.

The driven pulley D, which as noted above is spaced on the frame structure S in relation to the idler pulley I for carrying the sanding belt B, is mounted directly on the pulley shaft 200 of an electric motor 202 arranged at the rear of the frame structure S on a bracket assembly 204 (see Figs. 5, 10, 11 and 12).

This bracket assembly 204 comprises a motor bracket 206 secured on a mounting plate 208 by slide clamps 210. The mounting plate 208 is fastened directly on the frame structure S as at 212, and the slide clamps 210 are arranged to be tightened down normally by screws as at 214 for holding the motor bracket 206 in fixed relation on the mounting plate 208. However, these slide clamps 210 are further arranged for allowing vertical adjustment of the motor bracket 206 on the mounting plate 208 upon loosening of the screws 214. To regulate this vertical adjustment, which is provided to allow the height of the driven pulley D above the sanding bed formed by the frame structure S to be adjusted similarly to the idler pulley I, the motor bracket 206 is fitted with an adjusting stud 216 having a squared lower tip portion 218 adapted for receiving a wrench or the like, as in the case of the stud 122 provided for idler pulley I. This adjusting stud 216 extends upwardly for threaded engagement with a lug fixed as at 220 on the upper portion of the mounting plate 208, the motor bracket 206 being slotted as at 222 to clear the lug 220 as it is raised or lowered on mounting plate 208 to adjust the driven pulley D at a desired height.

Figure 1:
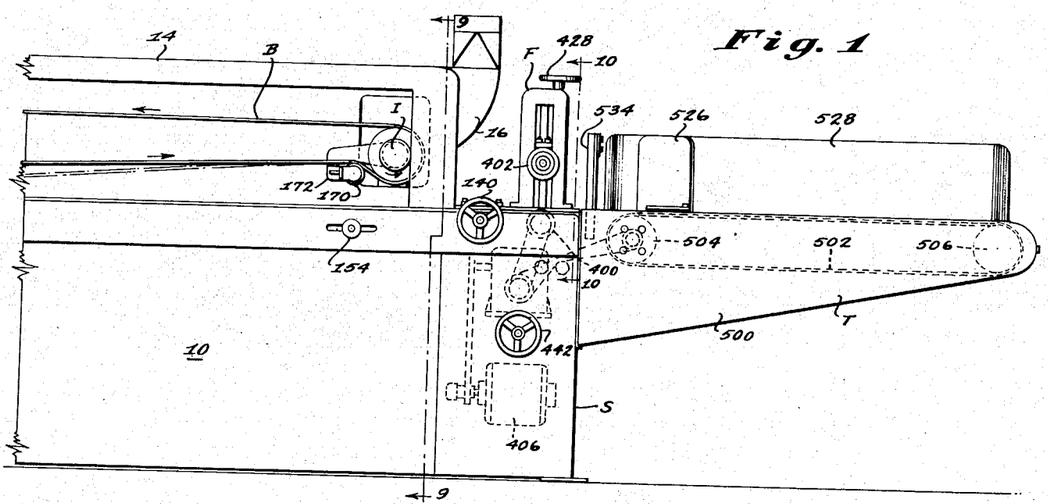
Fig. 1 is a fragmentary front side elevation of the feeding end of a sanding machine constructed in accordance with the present invention.
Figure 2:
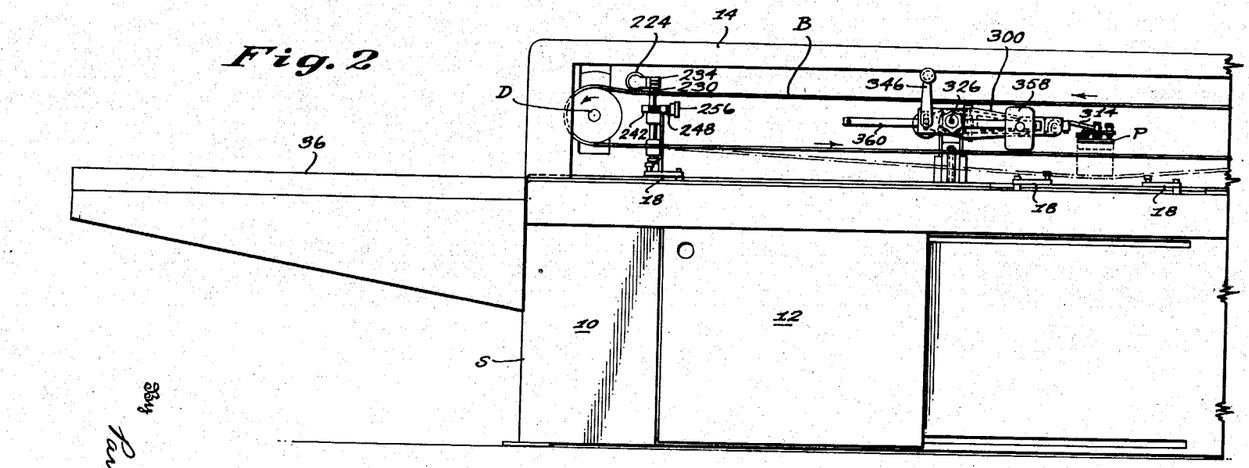
Fig. 2 is a complementary front side elevation of the remaining portion of the machine shown in Fig. 1.

It should also be noted at this point that, as previously mentioned, the driven pulley D is disposed on the frame structure S at the end opposite to the end at which the work W is fed beneath the sanding belt B by the feed means F, and further that the driven pulley D is operated to drive the sanding belt B in a direction opposite to the direction in which the work W is fed for sanding, as indicated by the directional arrows in Figs. 1 and 2. This arrangement and manner of operation of the driven pulley D results in inducing slack in the sanding belt B between the pulley D and the pressure pad P, which is a particularly advantageous feature when the work W being sanded has an irregular surface contour because this slack induced ahead of the pressure pad P substantially facilitates the application of the sanding belt B by the pressure pad P in conformance with the irregular contour of the work W.

For this same general purpose, it has long been common practice to work longitudinal creases in an endless sanding belt of the type represented by the reference character B in order to condition it for breaking or folding sharply in a widthwise direction to reach satisfactorily sharp angular points in the surface contours of the work being sanded. This expedient is of material aid in carrying out standing operations generally as well as with the machine of the present invention. It involves one troublesome difficulty, however, in that a sanding belt B that has been longitudinally creased for this purpose has a tendency to fold upon itself as it runs so that it cannot be maintained flatly extended to full width over the pulleys D and I on which it is carried, and for this reason the extent to which advantage may be gained by longitudinally creasing the sanding belt B is normally, as a practical matter, seriously limited.

This difficulty is greatly reduced according to the present invention by arranging auxiliary idler rolls in relation to one or both of the sanding belt pulleys D and I to run in contact with the face of the sanding belt B just before it is taken over these pulleys D or I. An auxiliary idler roll is shown at 224 arranged in this manner in relation to the driven pulley D. This idler roll 224, as shown, is mounted for rotation in bearing units as at 226 which are carried on a supporting arm 228 that extends from a vertical pivot shaft 230 disposed at the rear of the frame structure S. The supporting arm 228 is keyed on the pivot shaft 230 as at 232, and formed with a split hub portion 234 for clamping adjacent the upper end of the pivot shaft 230 at a desired vertical position in relation to the driven pulley D.

The pivot shaft 230 is in turn supported for pivoting movement in bores of spaced bosses formed as at 236 on a mounting bracket 238 that is secured as by screws 240 on the driven pulley mounting bracket 208. The pivot shaft 230 is retained in the bosses 236 of mounting bracket 238 by an adjusting arm 242 having a hub 244 fixed on the pivot shaft 230 above the bosses 236, and a spacing collar 246 similarly fixed below. The adjusting arm 242 extends from the pivot shaft 230 below the supporting arm 228 toward the front of the frame structure S, and the mounting bracket 238 also supports in fixed relation an adjusting arm bracket 248 that extends adjacent the adjusting arm 242. The extending ends of both the adjusting arm 242 and adjusting arm bracket 248 are fitted with pivot pins as at 250 and 252, respectively, formed to receive an adjusting screw 254 carrying a manipulating knob as at 256. The pivot pin 252 in the adjusting arm bracket 248 receives the adjusting screw 254 freely, while the pivot pin 250 in the adjusting arm 242 is threaded to engage its extending end, and a spring 258 is disposed over the adjusting screw 254 between the bracket 248 and arm 242 to maintain them in adjusted spaced relation.

This arrangement disposes the auxiliary idler roll 224 directly on the bracket assembly 204 for the driven pulley D so that their relative positions are not disturbed during any vertical adjustment of the pulley D. Also, as noted above, the idler roll 224 is independently adjustable on the pivot shaft 230 in relation to the pulley D. Usually, the idler roll 224 should be positioned with it bottom surface somewhere on the order of about 3/4" below the top surface of the pulley D. With this relative disposition, the sanding belt B is subjected to a reverse bending as it is taken over the idler roll 224 onto the pulley D which maintains it flat in a very effective manner even when a substantial amount of longitudinal creasing is present in the belt B. An auxiliary idler roll 224 of this sort may also be employed to good effect for guiding or truing the sanding belt B on the pulleys D and I by making it pivotally adjustable through an adjusting arm 242 and an adjusting arm bracket 248 as described above.

An auxiliary idler roll may similarly be arranged as at 170 in relation to the idler pulley I, if desired. In most cases an idler roll 224 at the driven pulley D is enough, but a second one may advantageously be prvided at the idler pulley I too, for use when needed. The idler roll 170 at the idler pulley I might be exactly like the driven pulley idler roll 224 as just described, but where a pivotal adjustment is provided for the pulley I directly, then the idler roll 170 need only be mounted for rotation on a supporting arm 172 carried by a bracket 174 having a split hub as at 176 adapted for clamping on the pulley shaft 104 to dispose the idler roll 170 at a proper operating position in relation to the idler pulley I, or at an inactive position clear of the sanding belt B when not needed.

The pressure pad P by which the sanding belt B is applied to the work W, as already mentioned, is disposed according to the present invention between the working and return reaches of the endless sanding belt B at the extending end of a supporting arm 300, which is carried on the frame structure S for pivoting movement about a horizontal axis to allow the pressure pad P to be lowered or raised for applying the sanding belt B to the work W or releasing it as desired. An important feature of this arrangement of the supporting arm 300 is that in raised position it is disposed with a pivoted extent substantially parallel to the line of travel of the reaches of the sanding belt B so that adequate clearance for disposition and application of the pressure pad P is provided between these reaches by driven and idler pulleys D and I which are no larger than are necessary for carrying the endless belt B to the best advantage. For example, a sanding machine may be constructed according to the present invention with driven and idler pulleys D and I having a diameter of only about 8 inches which will handle work W up to about 4 inches in thickness, and which allow a well-balanced design for the machine and make it possible to correlate the size of the driven pulley D nicely with the driving motor 202.

Another important feature of the arrangement of the supporting arm 300 is the provision adjacent its horizontal pivot axis of a pivoted joint allowing lateral pivoting movement of its extending portion of an axis disposed at right angles to the horizontal pivot axis, and further arranged so that this lateral pivot axis is positioned substantially vertically when the supporting arm 300 is lowered to position the pressure pad at its farthest downward extent, i. e., directly on the frame structure S with no work W disposed beneath the sanding belt B. Accordingly, when work W is fed beneath the sanding belt B, so that the supporting arm 300 must be positioned above its farthest downward extent, this lateral pivot axis will be inclined backwardly from the vertical so that any lateral movement of the supporting arm 300 will cause the pressure pad P to be applied with greater force against the sanding belt B which, together with the gravity force on the pressure pad P, will set up a moment about the lateral pivot axis tending to return the supporting arm 300 to normal position. As a result any force exerted by the work W during the sanding operation which tends to move the pressure pad P laterally out of line will be resisted by this disposition of the supporting arm 300, so that the application of the pressure pad P during the sanding operation is inherently stabilized.

Figure 13:
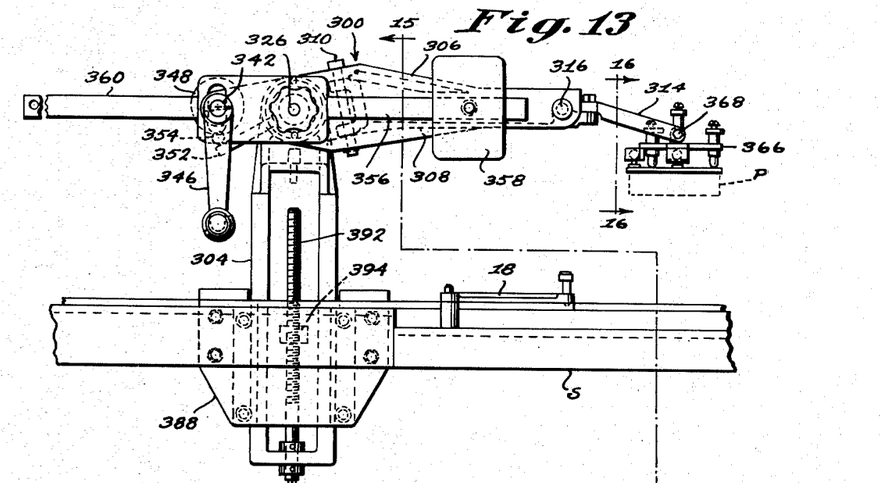
Fig. 13 is an enlarged side elevation detail of the means supporting the pressure pad used for applying the endless sanding belt.
Figure 14:
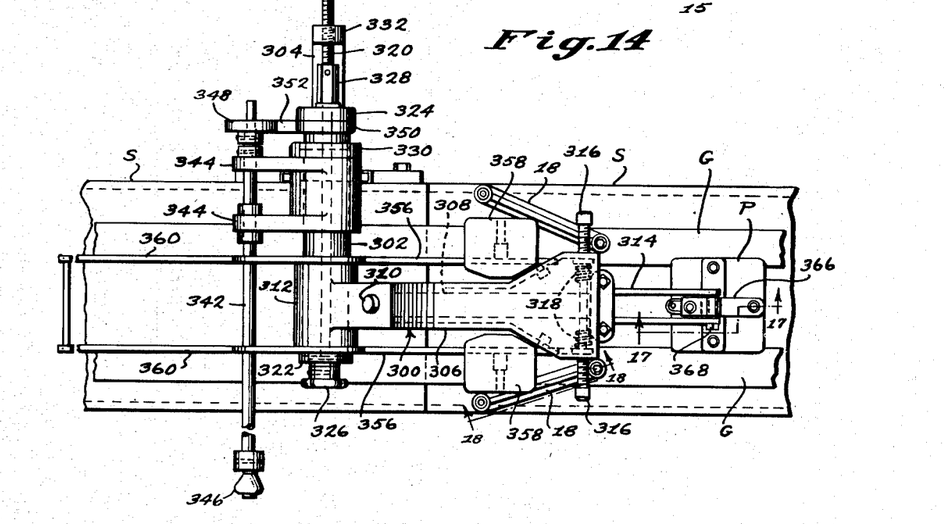
Fig. 14 is a detail in plan corresponding generally to Fig. 13.
Figures 15, 16, 17, 18:
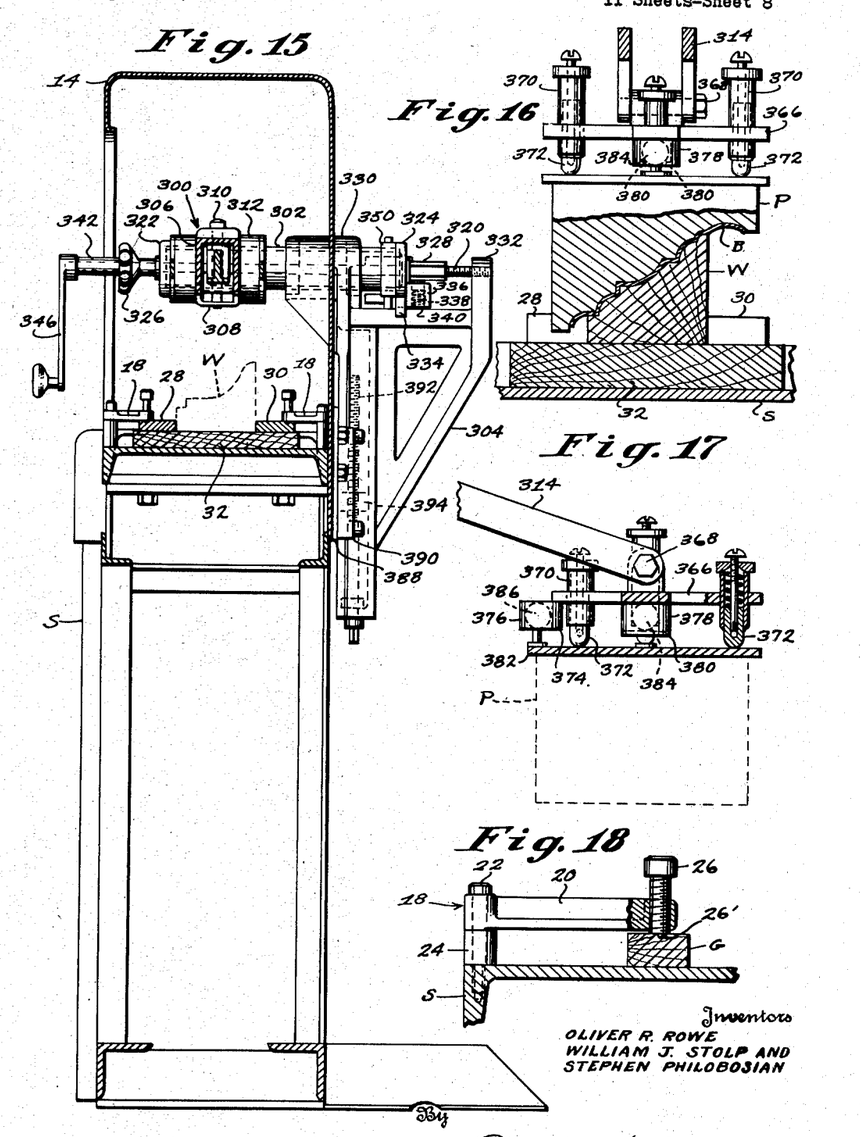
Fig. 15 is a sectional detail taken substantially on the line 15—15 in Fig. 13.
Fig. 16 is a detail largely in section, as viewed substantially from the line 16—16 in Fig. 13.
Fig. 17 is a sectional detail taken substantially on the line 17—17 in Fig. 14.
Fig. 18 is a sectional detail taken substantially on the line 18—18 in Fig. 14.
Figure 19:
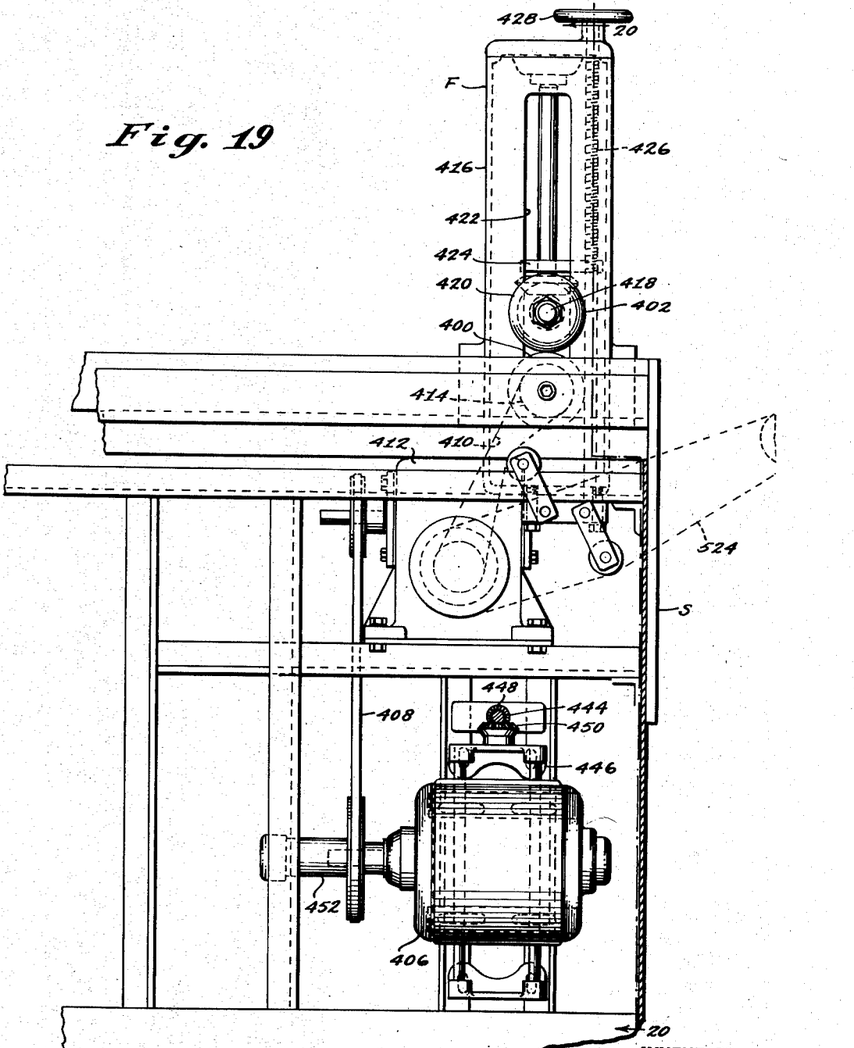
Fig. 19 is an enlarged side elevation detail of the feed means and related operating elements.

With more particular reference to the structural form and disposition of the supporting arm 300, which is illustrated in detail in Figs. 13, 14 and 15 of the drawings, the horizontal pivot axis for the supporting arm 300 is formed by a tubular pivot shaft 302 which is carried in a mounting bracket 304, arranged at the rear of the frame structure S, with the pivot shaft 302 free for lateral sliding movement as well as rotation, as will appear more in detail presently.

The supporting arm 300 proper comprises two principal structural elements 306 and 308 which are assembled at a pivot pin 310 forming the previously mentioned lateral pivot axis. The first element 306 is formed with a hub portion 312 at which it is fitted over and fixed on the pivot shaft 302, and is otherwise arranged in the nature of a yoke or clevis for receiving the pivot pin 310 and with the upper portion of this yoke-like structure extending as a covering apron over the second element 308. The second element 308 consists of an arm member which extends from the pivot pin 310 under and beyond the covering apron portion of the first element 306 to carry a mounting bracket 314 for the pressure pad P. The covering apron portion of the first element 306 is further fitted adjacent its extending end with adjusting screws 316 arranged to bear oppositely on springs 318 disposed at each side of the second element or arm member 308 for maintaining it normally balanced at a centrally aligned position, although allowing it to shift laterally when necessary during the sanding operation.

The arrangement of the horizontal pivot shaft 302 on which the supporting arm 300 is carried is illustrated best in Fig. 15 of the drawings. As shown, this pivot shaft 302 is tubular in form, and is assembled concentrically on a screw shaft 320 between front and rear housing collars as at 322 and 324, which are disposed freely on the screw shaft 320, but which are retained in fixed lateral relation for supporting the pivot shaft 302 by an adjusting knob 326 pinned on the screw shaft 320 at its front end, and an hexagonal-shaped collar 328 likewise pinned on the screw shaft 320 adjacent its rear end. The pivot shaft 302 is slidingly supported as at 330 in a bored boss formed on the mounting bracket 304, while the screw shaft 320 on which it is assembled extends further rearwardly for threaded engagement with an upstanding lug 332 also formed on the mounting bracket 304 in spaced relation with respect to the boss 330, the previously mentioned rear housing collar 324 and the hexagonal-shaped collar 328 being arranged on the screw shaft 320 between the boss 330 and this upstanding lug 332.

The rear housing collar 324 is additionally formed with spaced depending lugs 334 disposed for straddling the adjacent portion of mounting bracket 304, and with a laterally extending boss 336 which is bored to receive and position a spring 338 and plunger 340 between this portion of the bracket 304 and the previously mentioned hexagonal-shaped collar 328 fixed on the screw shaft 320. The spaced lugs 332 prevent the rear housing collar 324 from turning with the screw shaft 320, and the spring 338 and plunger 340 are provided to maintain the screw shaft 320 at a given lateral position, the hexagonal-shaped collar 328 being employed to present a series of bearing faces for the plunger 340, against one of which the spring 338 yieldingly presses the plunger 340 to resist turning of the screw shaft 320 except under turning pressure exerted from the adjusting knob 326. It will be seen that turning of the screw shaft 320 will result in advancing or withdrawing it at the lug 332 on bracket 304, which will in turn result in lateral adjustment of the pivot shaft 302 and the supporting arm 300 it carries for supporting the pressure pad P.

For raising and lowering the supporting arm 300 in order to shift the pressure pad P between operating and inactive positions, a cam shaft 342 is carried in lateral arm portions 344 formed on the boss 330 of the mounting bracket 304. This cam shaft 342 is fitted at its forward end with an operating arm 346 arranged conveniently at the front of the frame structure S, and carries a cam element 348 at its rear end in relation to a cam follower bracket 350 fixed on the pivot shaft 302. The cam follower bracket 350 is formed with an extending arm portion 352 fitted with a laterally disposed follower element 354 at its extending end for following the cam element 348 in various laterally adjusted positions of the pivot shaft 302 and supporting arm 300. The cam element 348 may accordingly be controlled from the operating arm 346 for raising the supporting arm 300 or releasing it to lowered position for application of the sanding belt B by the pressure pad P as desired.

In order to regulate the pressure with which the sanding belt B is applied by the pressure pad P, the supporting arm 300 is further fitted with guideways 356 for carrying weights as at 358. The guideways 356 are secured on the supporting arm 300 at the hub portion 312 of the first element 306, and adjacent the extending end of the covering apron portion of the element 306, so that they allow a range of adjustment of the weights 358 in relation to the horizontal pivot axis of the supporting arm 300 for varying the pressure with which the pressure pad P is applied. The guideways 356 are also extended rearwardly to form counterweight balance arms as at 360 for supporting a counterweight (not shown) in instances where the pressure with which the pressure pad P is applied needs to be counterbalanced. The counterweight balance arms 360 extend from the hub portion 312 and are slotted as at 362 to provide clearance for the cam shaft 342, and are further fitted with a cross brace 364 at their rear ends.

The pressure pad P, as previously mentioned, is carried in a mounting bracket 314 at the extending end of the arm portion element 308 of the supporting arm 300. This mounting bracket 314 has a clevis form arranged for carrying a pressure pad holder 366 at a clevis pin 368. The pressure pad holder 366 has a spider form composed of arm portions extending laterally to each side and frontwardly and rearwardly from its point of support at the clevis pin 368, and in each of these arm portions plunger sleeves 370 are arranged to carry spring positioned plungers 372. The pressure pad holder 366 is also formed with a depending flange 374 at the extending end of its rear arm portion, which is fitted with a semicircular bracket 376, and depending flanges 378 formed with inwardly extending bottom edges as at 380 to form an undercut longitudinal slot are arranged substantially centrally of the holder 366. A mounting plate 382 is provided for carrying the pressure pad P directly, and this mounting plate 382 is formed with two upstanding ball-pointed studs as at 384 and 386. The ball stud 384 is disposed centrally of the mounting plate 382 and is thereby arranged for fitting in the longitudinal slot formed by the flanges 378, while the ball-pointed stud 386 is arranged for disposition in the semicircular bracket 376 behind the depending flange 374. By this arrangement, the bearing point of the ball-pointed stud 386 on the rear flange 374 constitutes the only means by which the mounting plate 382 is held longitudinally in the holder 366, the ball-pointed stud 384 merely serving the purpose of maintaining the longitudinal alignment of the mounting plate 382. As a result, the mounting plate 382 is carried in the holder 366 so that it is free to float in all directions, although always fully restrained in longitudinal alignment, and is further easily removed from the holder 366 for changing pressure pads P. The pressure pad P carried by the mounting plate 382 will, of course, be appropriately adapted for applying the sanding belt B to the work W and may take any conventional form.

It should also be noted that the mounting bracket 304 for the supporting arm 300 carrying the pressure pad P is secured on the frame structure S by a mounting plate 388 and slide clamps 390 in a manner similar to the mounting arrangement of the driven pulley D, the mounting bracket 304 being fitted with an adjusting stud as at 392 for threaded engagement with a lug arranged as at 394 on the mounting plate 388.

The feed means F, which is provided for feeding work beneath the sanding belt B is illustrated in detail in Figs. 19 to 22. This feed means F comprises a bottom driven feed roll 400 and an overhead pressure wheel 402 which is also driven. The bottom feed roll 400 is carried on a shaft 404 which is journaled on the frame structure S, and which may be driven in any convenient manner, such as by an electric motor 406 connected by belt or sprocket chain drives 408 and 410 through a gear box 412 to a pulley or sprocket wheel 414 carried on the bottom feed roll shaft 404.

The overhead pressure wheel 402 is provided to maintain the work in contact with the bottom feed roll 400 for effective feeding action, and for this purpose is mounted for vertical adjustment in a support housing 416 fixed at the rear of the frame structure S, the stub shaft 418 carrying the pressure wheel 402 being journaled in a bearing 420 which is slidingly arranged in a vertical guideway as at 422 in the front face of the housing 416, and which is fitted with a cap plate 424 extending inside the housing 416 and formed with a threaded opening for engaging an adjusting screw 426 vertically disposed in the housing 416 for manipulation from a hand wheel 428 at its top end.

In order to provide for driving the pressure wheel 402, the stub shaft 418 is arranged to extend through the bearing 420 for supporting a bevel gear 430 in engagement with a mating bevel gear 432 slidingly keyed on a vertical shaft 434 also carried by the housing 416. This mating bevel gear 432 is assembled for rotation in the cap plate 424 fitted on the bearing 420 for the pressure wheel stub shaft bearing 418, so that it is maintained in engagement with the bevel gear 430 on stub shaft 418 at all vertically adjusted positions of the pressure wheel 402. A second bevel gear 436 is keyed on the vertical shaft 434 at its lower end to engage a mating bevel gear 438 carried at the rear end of the bottom feed roll shaft 404, so that the vertical shaft 434 is driven from the bottom feed roll shaft 404 and in turn drives the pressure wheel stub shaft 418. This feature improves the feeding action at the feed means F substantially because the drive for the overhead pressure wheel 402 results in drawing the work into the nip of the feed means F much more readily than when only the bottom feed roll 400 is driven, and it further provides for handling special forms of work with which adequate feeding contact can be had only at their top surfaces. In this connection, it should be noted too that the overhead pressure wheel 402 is arranged for lateral adjustment on the stub shaft 418 by opposed jam nuts as at 440 to position it properly for feeding contact with the work. Means for speed adjustment at the feed means F, and for the feed table T which is described further below, is provided from a handwheel 442 arranged at the front of the frame structure S for adjustment of the vertical position of the motor 406, through shaft 444 and an adjustable motor base mounting 446 connected by bevel gears as at 448 and 450, to actuate a variable speed motor pulley 452.

Figure 3:
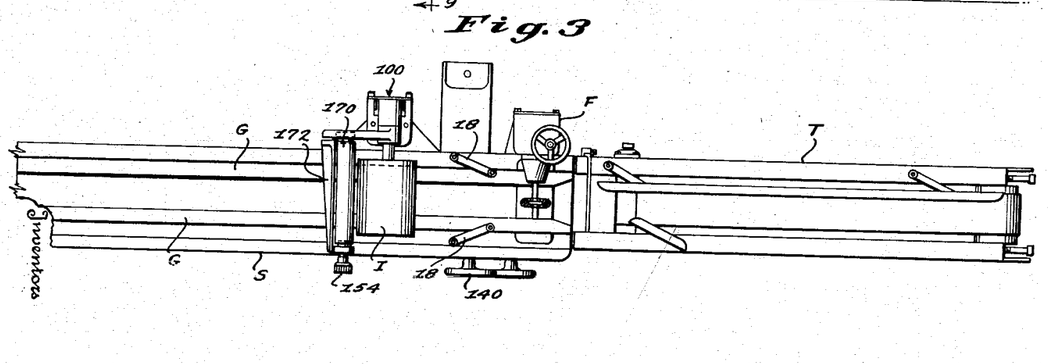
Figs. 3 and 4 are fragmentary plan views corresponding to Figs. 1 and 2, respectively.
Figure 4:
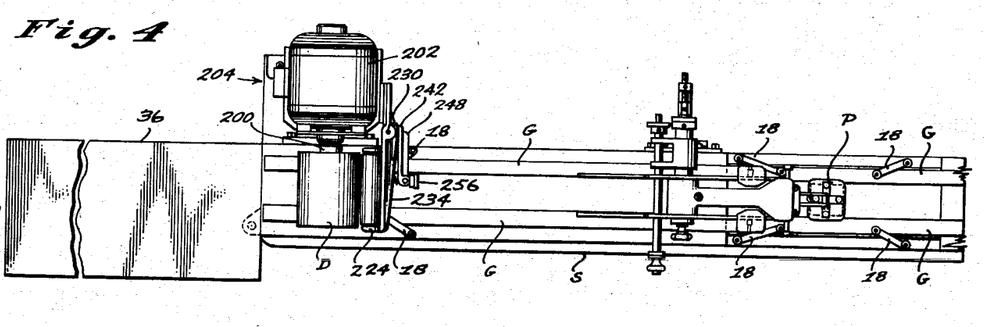
Figure 5:
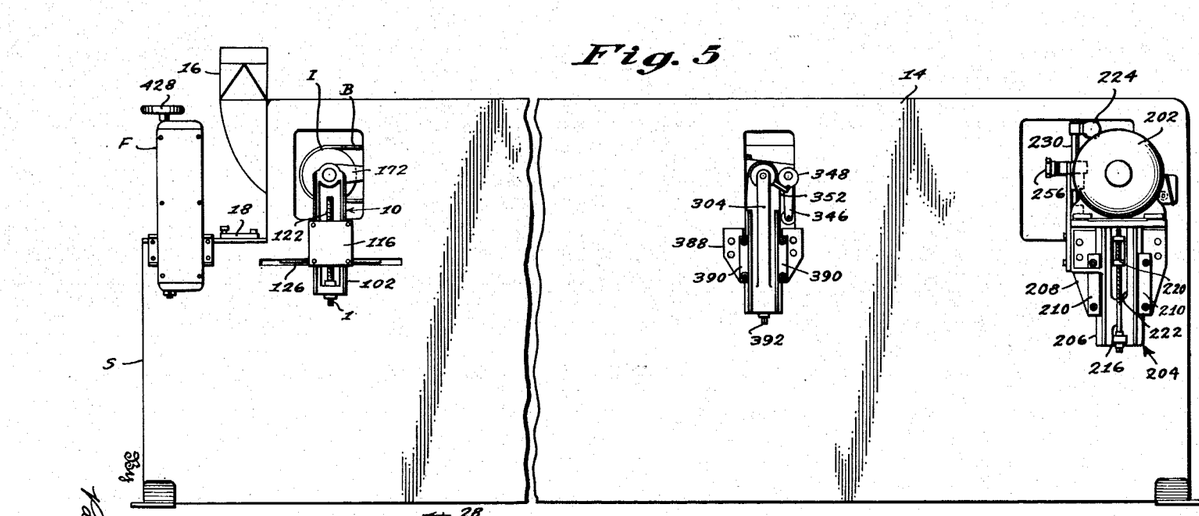
Fig. 5 is a rear elevation of the main portion of the sanding machine shown in Figs. 1 to 4.
Figure 6:
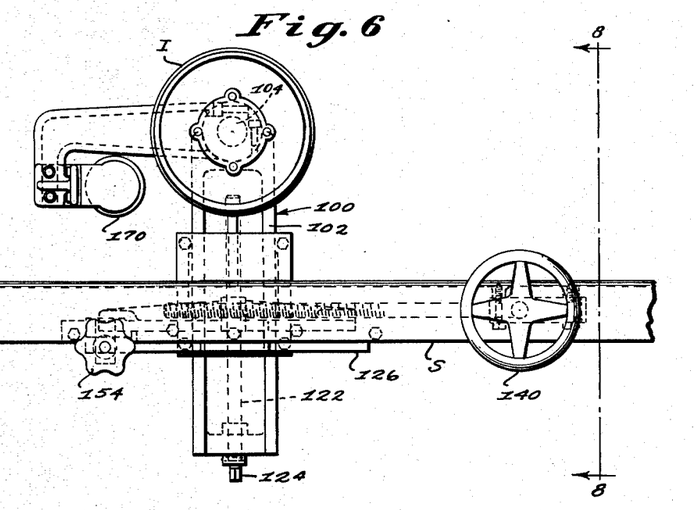
Fig. 6 is an enlarged side elevation detail of the idler pulley and related operating elements.
Figure 7:
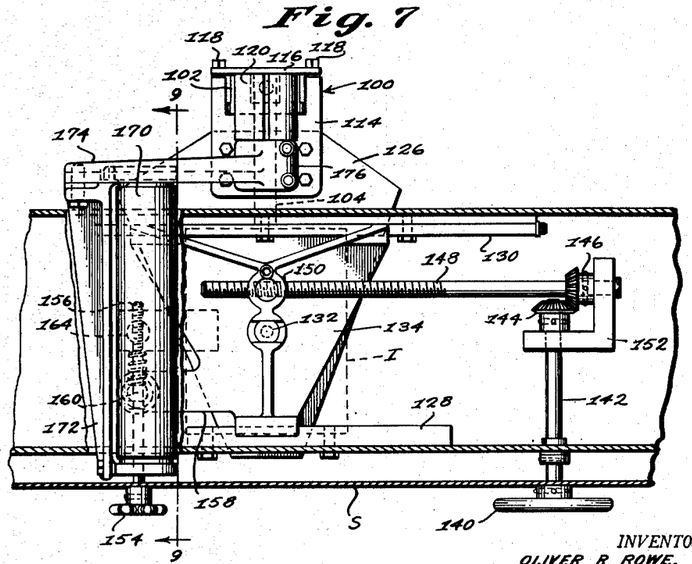
Fig. 7 is a view in plan corresponding generally to Fig. 6.
Figure 23:
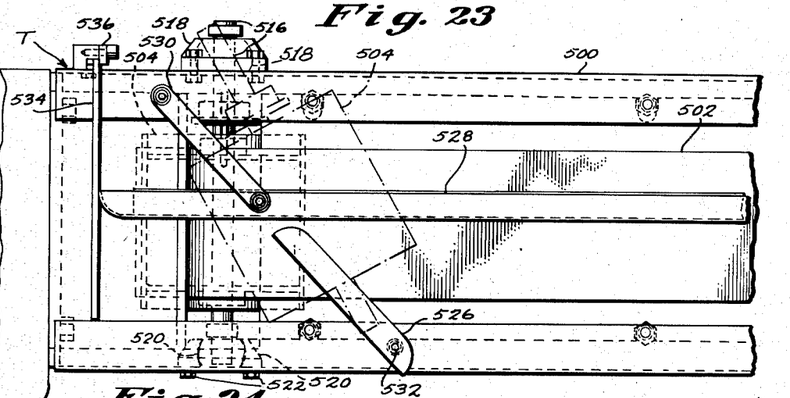
Fig. 23 is an enlarged fragmentary detail in plan of the feed table.
Figures 24, 25:
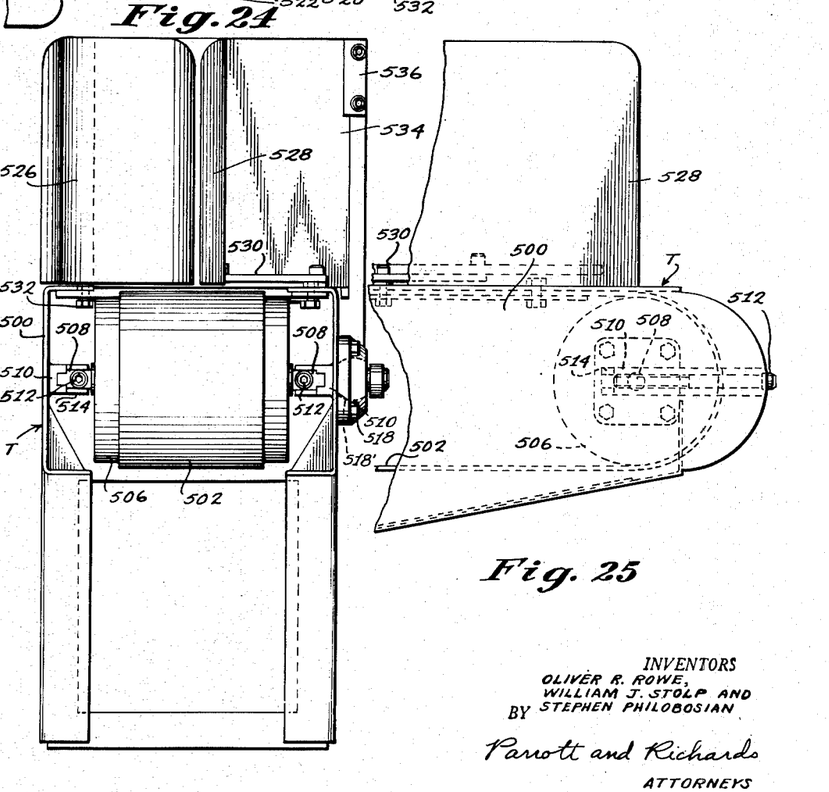
Fig. 24 is an end elevation of the entire feed table taken from the right in relation to Fig. 23.
Fig. 25 is a fragmentary side elevation of the extending end portion of the feed table.

As previously mentioned, a supply of the work to be sanded is maintained at the feed means F by a feed table T as shown generally in Figs. 1 and 3 of the drawings, and illustrated more in detail in Figs. 23 and 24. As shown, this feed table T comprises a housing frame 500 secured on the frame structure S to extend at the feeding end for carrying a conveyor belt 502 on front and rear mounting pulleys 504 and 506. The rear mounting pulley 506 is fitted for rotation on a shaft 508 formed with flat-sided ends which are carried in the housing frame 500 by horizontally slotted mounting blocks 510 adapted to receive the flat-sided ends of the shaft 508. In this manner, the shaft 508 is maintained against rotation in the mounting blocks 510 but is free for sliding adjustment for tightening the conveyor belt 502 properly. This sliding adjustment is provided for by screws 512 fitted laterally in the shaft 508 adjacent its ends to bear on abutment lugs 514 formed on the mounting blocks 510, and thereby space the shaft 508 in the mounting blocks 510 to obtain the belt tightness desired. It should be noted, however, that the shaft 508 is held in the mounting blocks 510 only by the pull of the conveyor belt 502, and that it accordingly may be removed from the housing frame 500 by simply sliding it rearwardly out of the mounting blocks 510 whenever the conveyor belt 502 is loosened for removal.

In order to provide for removing the conveyor belt 502 with equal ease at the front mounting pulley 504, the shaft 516 on which this front pulley 504 is fixed is mounted in bearings 518 and 520 at the front and rear of the housing frame 500 which are of the self-aligning type incorporating spherical shaped bushings, as indicated by dotted lines at 518' and 520' to support the shaft 516. The front bearing 518 is mounted inside the housing frame 500 so that its mounting screws 522 are readily accessible at the front face of the housing frame 500, while the rear bearing 520 is mounted on the back face of the housing frame 500 to space it as far as possible from the front bearing 518. With bearings of this type arranged in the manner just described, it is possible by simply removing the mounting screws 522 to free the front bearings 518 from the housing frame 500, and then to pivot the shaft 516 about its point of support in the rear bearing 520 by reason of the spherical shaped bushing which this bearing contains, as mentioned above, and thereby dispose the front mounting pulley 504 angularly, as indicated by dotted lines in Fig. 23, so that the conveyor belt 502 may be slipped off of its free end and removed easily with the rear mounting pulley 506 for replacement when necessary.

Figures 20, 21, 22:
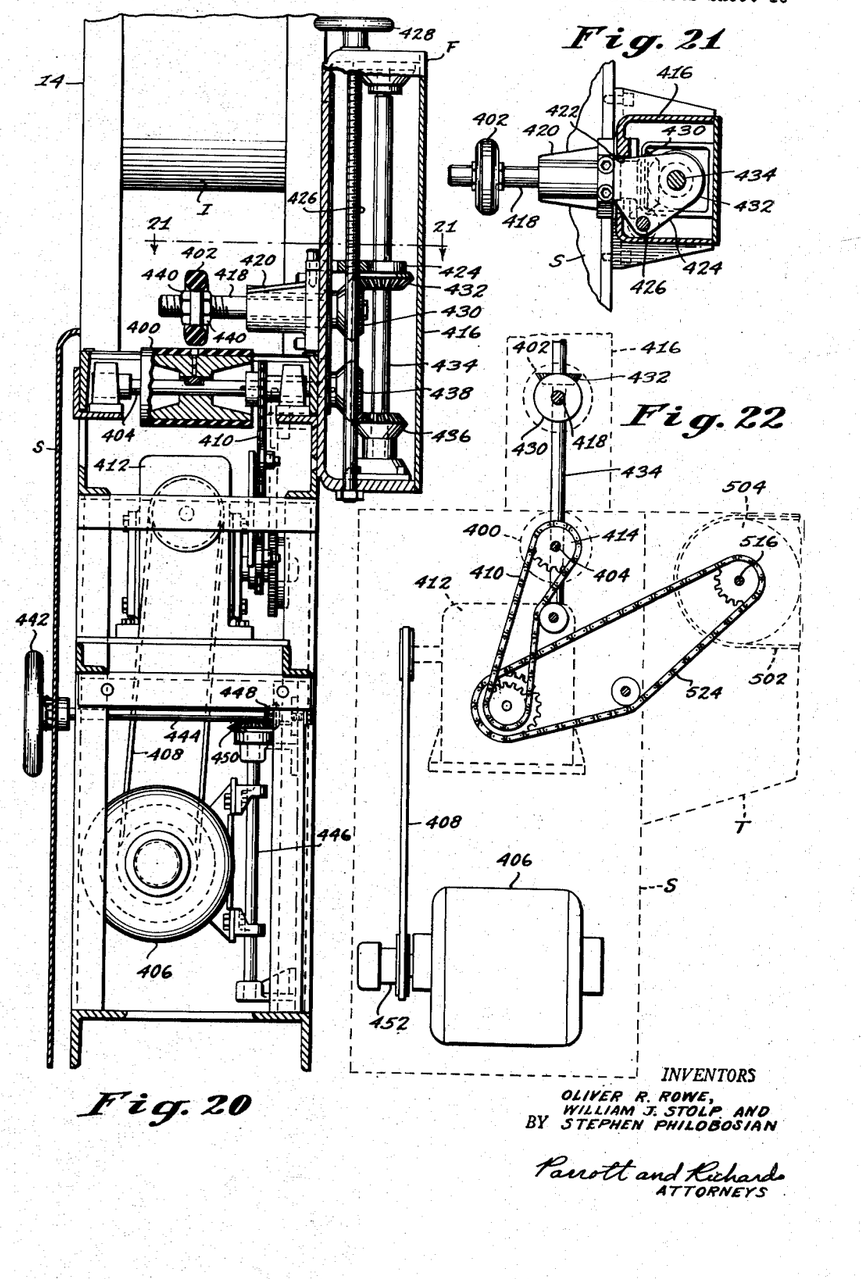
Fig. 20 is a sectional detail taken substantially on the line 20—20 in Fig. 19.
Fig. 21 is a sectional detail taken substantially on the line 21—21 in Fig. 20.
Fig. 22 is an illustration, mainly diagrammatic, corersponding generally to Fig. 19 and illustrating the driving arrangement for the feed means.

When in place, the conveyor belt 502 is driven at the front mounting pulley 504 through a belt or sprocket drive 524 running from the previously mentioned gear box 412 at the feed means F to the front pulley shaft 516 (see Fig. 22).

The housing frame 500 is further fitted with front and rear guide members 526 and 528 for channeling the work on the conveyor belt 502 to the feed means F. The rear guide member 528 consists of an upstanding guide flange of substantial height which extends for substantially the entire length of the feed table T, and which is carried on the housing frame 500 by pivoted arms 530 which allow it to be spaced over the conveyor belt 502 as desired. The front guide member 526 consists of an upstanding flange of comparable height, but of relatively short extent, which is pivoted as at 532 on the housing frame 500 for angular disposition adjacent the forward end of the rear guide member 528 for directing the work against the rear guide member 528 as it is advanced forwardly on the conveyor belt 502. Beyond the forward end of the rear guide member 528, the housing frame 500 also carries a gate member 534 which consists of a vertically disposed plate arranged for sliding adjustment in a slide clamp 536 so that its lower edge may be adjusted above the level of the conveyor belt 502 in accordance with the thickness of the work being handled for allowing only one piece of work at a time to pass onto the feed means F. With front and rear guide members 526 and 528 and a gate member 534 arranged in this manner, it is possible to adjust them in relation to the size and form of the work W being handled so that pieces of the work W may be placed on the feed table T in a very rapid manner without particular attention to their precise arrangement other than to see that they are resting on the conveyor belt 502.

We claim:

1. A sanding machine particularly adapted for sanding woodwork having an irregular surface contour such as molding and the like, said machine comprising a frame structure, a driven pulley and an idler pulley disposed on said frame structure in spaced relation for carrying an endless sanding belt, means disposed at one end of said frame structure for feeding work to be sanded beneath the endless sanding belt longitudinally of the reach of said belt, and a pressure pad disposed on said frame structure intermediate said spaced pulleys for applying the endless sanding belt to the work to be sanded, said driven pulley being operated to drive said endless belt for application to the work in a direction opposite to the direction in which the work to be sanded is fed and being disposed on said frame structure at the end opposite to the end at which the work to be sanded is fed, whereby slack is induced in the endless sanding belt between said driven pulley and said pressure pad for facilitating application of said endless belt by said pressure pad in conformance with the contour of the work to be sanded, and said idler pulley being adjustable on said frame structure vertically and longitudinally with respect to the reach of the endless sanding belt and pivotally on an axis coincident with the medial cross-section of the idler pulley, whereby said idler pulley may be adjusted for regulating the slack in said endless belt and for truing the belt on said pulleys without disturbing the slack regulation of said belt.

2. A sanding machine comprising a frame structure, a driven pulley and an idler pulley disposed on said frame structure in spaced relation for carrying an endless sanding belt, and a pressure pad arranged intermediate said spaced pulleys for applying the endless sanding belt to work to be sanded, said pressure pad being mounted on a pivoted supporting arm carried by said frame structure for pivoting movement about a horizontal axis extending transversely between the working and return reaches of said endless belt, and said supporting arm being further formed with a pivoted joint adjacent the point of pivoted support on said frame structure, the axis of said pivoted joint being disposed at right angles to said horizontal pivot axis and being positioned vertically when said supporting arm is disposed to position the pressure pad at its furtherest downward extent.

3. A sanding machine comprising a frame structure adapted to support work to be sanded, a driven pulley and an idler pulley disposed on said frame structure in spaced relation for carrying an endless sanding belt, means on said frame structure for feeding work to be sanded beneath said endless sanding belt, and a pressure pad disposed on said frame structure intermediate said spaced pulleys for applying the endless sanding belt to the work to be sanded, said driven pulley being operated to drive said endless belt for application to the work in a direction opposite to the direction in which the work to be sanded is fed, and said driven pulley being disposed on said frame structure at the end opposite to the end at which the work to be sanded is fed, whereby slack is induced in the endless sanding belt between said driven pulley and said pressure pad for facilitating application of said endless belt by said pressure pad in conformance with the contour of the work to be sanded, said pressure pad being mounted on a pivoted supporting arm carried by said frame structure for pivoting movement about a horizontal axis extending transversely between the working and return reaches of said endless belt, and said supporting arm being further formed with a pivoted joint adjacent the point of pivoted support on said frame structure, the axis of said pivoted joint being disposed at right angles to said horizontal pivot axis and being positioned vertically when said supporting arm is disposed to position the pressure pad at its furtherest downward extent.

4. A sanding machine comprising a frame structure, a driven pulley and an idler pulley disposed on said frame structure in spaced relation for carrying an endless sanding belt, and a pressure pad arranged intermediate said spaced pulleys for applying the endless sanding belt to work to be sanded, said pressure pad being removably mounted by two longitudinally spaced ball-pointed swivel pins on a supporting arm carried by said frame structure, and said supporting arm being formed with sockets for removably receiving said pins with both pins restrained against lateral shifting and one pin restrained against longitudinal shifting but free for vertical shifting, whereby said pressure pad is disposed to float freely in all directions but is always fully restrained in longitudinal alignment.

5. A sanding machine comprising a frame structure, a driven pulley and an idler pulley disposed on said frame structure in spaced relation for carrying an endless sanding belt, and a pressure pad arranged intermediate said spaced pulleys for applying the endless sanding belt to work to be sanded, said pressure pad being mounted on a supporting arm carried by said frame structure, and means for mounting said pressure pad on said supporting arm comprising a holder secured at the extending end of said supporting arm for pivoting about a transverse axis, a mounting plate adapted for carrying said pressure pad and fitted with two longitudinally spaced ball-pointed swivel pins, said holder being formed with sockets for removably receiving said pins with one pin restrained against longitudinal shifting but free for vertical shifting and both pins restrained against lateral shifting, whereby said mounting plate is always retained in longitudinal alignment with said holder, and yieldable means on said holder for normally maintaining said mounting plate with a level disposition but allowing said mounting plate to rock in all directions.

6. A sanding machine comprising a frame structure adapted to support work to be sanded, a driven pulley and an idler pulley disposed on said frame structure in spaced relation for carrying an endless sanding belt, and means on said frame structure for forwarding work to be sanded beneath said endless sanding belt, said feeding means comprising a driven bottom feed roll and a driven top pressure wheel, said driven bottom feed roll being provided with a shaft for mounting in fixed bearings on said frame structure, said top pressure wheel being provided with a stub shaft for mounting in a vertically adjustable bearing on said frame structure, said feed roll shaft and said pressure wheel stub shaft each being fitted with bevel gears, and a vertical auxiliary shaft disposed on said frame structure and fitted with mating bevel gears for engaging each of said first mentioned bevel gears, said auxiliary shaft being formed for slidingly carrying the mating bevel gear engaging the bevel gear on said pressure wheel stub shaft, whereby said top pressure wheel is geared with and driven from said bottom feed roll at all vertically adjusted positions of said top pressure wheel on said frame structure.

7. A sanding machine comprising a frame structure adapted to support work to be sanded, a driven pulley and an idler pulley disposed on said frame in spaced relation for carrying an endless sanding belt, means on said frame structure for feeding work to be sanded beneath said endless sanding belt, and means on said frame structure for maintaining a supply of work to be sanded at said feeding means, said last mentioned means comprising a conveyer belt and associated guides for channeling said work in line on said conveyer belt, said conveyer belt being carried on front and rear mounting pulleys fitted with shafts journalled on said frame structure, the journal bearings for said rear mounting pulley being slidably arranged in open-ended slots on said frame structure, and the journal bearings for said front mounting pulley containing spherical bushings whereby upon taking down one of said journal bearings said front pulley shaft may be pivoted in the other journal bearing and thereby allow said conveyer belt to be removed for replacement when necessary.

8. A sanding machine as defined in claim 7 and further characterized in that said last mentioned means also comprises a vertically adjustable plate forming a gate member disposed in relation to said guides and conveyor belt whereby the lower edge of said plate may be adjusted above the level of said conveyor belt for allowing only one piece of said work at a time to pass on said conveyor belt for feeding beneath said sanding belt.

9. In a sanding machine comprising a frame structure and a driven pulley and an idler pulley disposed on said frame structure in spaced relation for carrying an endless sanding belt, means for disposing said idler pulley on said frame structure comprising longitudinal guideways fixed on said frame structure, a top slide base riding on said guideways for sliding movement longitudinally thereof, a bottom slide base disposed below said guideway and pivotally supported from said top slide base on a vertical axis coincident with the intersection of the axis of rotation and medial cross section of said idler roll, said bottom slide member being secured at said pivotal support for clamping said top slide member on said guideways against casual movement, a vertical support post mounted on said bottom slide member for carrying said idler pulley, a first adjusting means for shifting said slide bases longitudinally on said guideways for regulating slack in said endless sanding belt, and a second adjusting means for pivoting said bottom slide member with respect to said top slide member for truing said endless sanding belt on said pulleys without disturbing the slack regulation of said belt.

10. A sanding machine comprising a frame structure, a driven pulley and an idler pulley disposed on said frame structure in spaced relation for carrying an endless sanding belt, and a pressure pad arranged intermediate said spaced pulleys for applying the endless sanding belt to work to be sanded, said pressure pad being mounted on a pivoted supporting arm carried by said frame structure for pivoting movement about a horizontal axis extending transversely between the working and return reaches of said endless belt, said supporting arm being further formed with a pivoted joint adjacent the point of pivoted support on said frame structure, the axis of said pivoted joint being disposed at right angles to said horizontal pivot axis and being positioned vertically when said supporting arm is disposed to position the pressure pad at its farthest downward extent, and said supporting arm being disposed with a pivoted extent in raised position substantially parallel with the line of travel of said endless belt, whereby adequate clearance is provided for disposition and application of said pressure pad between the working and return reaches of said endless belt by pulleys no larger than are necessary for carrying said endless belt to the best advantage.

11. A sanding machine as defined in claim 9 and further characterized in that a support piece is arranged on said frame structure directly beneath said pressure pad together with guide strips for channeling work to be sanded to and from said support piece, said frame structure being undercut beneath said pressure pad to receive said support piece, said support piece and guide strips being formed to provide a free path for the endless sanding belt when applied by said pressure pad to the full contour of the work to be sanded, and clamping means on said frame structure for positioning said support piece and guide strips thereon, said clamping means comprising arm members pivoted on said frame structure and clamping screws fitted at the extending ends of said arm members for adjustment to clamp said support piece and guide strips against said frame structure and thereby secure them in place.

References Cited in the file of this patent

UNITED STATES PATENTS

| Number | Name | Date |
|---|---|---|
| 445,382 | Sawyer | Jan. 27, 1891 |
| 645,717 | Fletcher | Mar. 20, 1900 |
| 661,552 | Rich et al. | Nov. 13, 1900 |
| 844,366 | Kitson | Feb. 19, 1907 |
| 905,525 | Hanson | Dec. 1, 1908 |
| 945,870 | Scovil | Jan. 11, 1910 |
| 1,022,827 | Cox | Apr. 9, 1912 |
| 1,136,146 | Krohn et al. | Apr. 20, 1915 |
| 1,536,249 | Walstrom | May 5, 1925 |
| 1,749,898 | Ward | Mar. 11, 1930 |
| 1,821,624 | Emmons | Sept. 1, 1931 |
| 1,826,177 | Johnson | Oct. 6, 1931 |
| 1,893,566 | Solem et al. | Jan. 10, 1933 |
| 1,978,149 | Stevenson | Oct. 23, 1934 |
| 1,986,521 | Oakley | Jan. 1, 1935 |
| 1,990,668 | Philippi | Feb. 12, 1935 |
| 1,995,382 | Fenton | Mar. 26, 1935 |
| 2,248,191 | Pratt | July 8, 1941 |
| 2,272,273 | Parker | Feb. 10, 1942 |
| 2,313,254 | Mead | Mar. 9, 1943 |
| 2,407,499 | Klossner | Sept. 10, 1946 |
| 2,456,217 | Rothrock | Dec. 14, 1948 |

FOREIGN PATENTS

| Number | Country | Date |
|---|---|---|
| 15,465 | Great Britain | May 24, 1895 |